United States Patent [19]

Müller et al.

[11] Patent Number: 4,995,802

[45] Date of Patent: Feb. 26, 1991

[54] APPARATUS FOR EXTRUDING PLASTIC MATERIALS

[75] Inventors: Dietmar Müller, Karlsruhe; Helmut Bauer, Malgersdorf; Harald Franken, Karlsruhe; Harry Seiter, Pfinztal, all of Fed. Rep. of Germany

[73] Assignee: Fraunhofer-Gesellschaft zur Forderung der angewandten Forschung e.V., Munich, Fed. Rep. of Germany

[21] Appl. No.: 386,102

[22] Filed: Jul. 28, 1989

[30] Foreign Application Priority Data

Aug. 5, 1988 [DE] Fed. Rep. of Germany ....... 3826641

[51] Int. Cl.$^5$ .................... C06B 21/00; B29C 47/96
[52] U.S. Cl. ................................. 425/154; 264/3.3; 425/136; 425/146; 425/149; 425/188; 425/190; 425/376.1; 425/DIG. 15
[58] Field of Search ............... 425/136, 146, 199, 150, 425/131.1, 153, 188, 190, 192 R, 183, 376.1, 380, 151, 154, DIG. 15; 264/3.1, 3.2, 3.3

[56] References Cited

U.S. PATENT DOCUMENTS

| | | | |
|---|---|---|---|
| 869,307 | 10/1907 | Jones | 425/153 |
| 4,124,346 | 11/1978 | Greenwood et al. | 425/188 |
| 4,619,599 | 10/1986 | Herbert et al. | 425/192 |
| 4,652,224 | 3/1987 | Golisch | 425/131.1 |
| 4,685,875 | 8/1987 | Chevroulet et al. | 425/136 |

OTHER PUBLICATIONS

"Hydraulic and Pneumatic Power and Control", edited by F. D. Yeaple, 1966, McGraw-Hill, N.Y., pp. 271, 284–287.

Primary Examiner—James C. Housel
Attorney, Agent, or Firm—Antonelli, Terry, Stout & Kraus

[57] ABSTRACT

An apparatus for extruding plastic materials, particularly plastic explosives or propellants, has a casing, at least one pressing member moving therein, e.g. a rotating extruder screw and a shaping retainer plate terminating the casing at the outlet side, which is fixed to the casing and can be raised therefrom if an excessive overpressure occurs. So as to ensure rapid raising and a rapid release of the overpressure when a safety hazard occurs, the retainer plate is fixed to the casing by a mechanical or a gas pressure spring, whose spring tension is adjustable. It is also possible to provide a hydraulic pressure directed in opposition to the spring and by which the retainer plate can be raised in random manner from the casing.

10 Claims, 1 Drawing Sheet

APPARATUS FOR EXTRUDING PLASTIC MATERIALS

FIELD OF THE INVENTION

The invention relates to an apparatus for extruding plastic materials, particularly plastic explosives and propellants, with a casing, at least one pressing member moving therein, e.g. a rotating extruder screw, and a shaping retainer plate terminating the casing on the outlet side, which is fixed to the casing and is raised from the casing if an excessive overpressure occurs.

BACKGROUND OF THE INVENTION

Apparatuses of the aforementioned type, which can be constructed as screw extruders, screw presses, ram presses, etc., are in particular used in plastics processing for the extrusion of plastic materials. However, they are also used for extruding other homogeneous and inhomogeneous plastic materials, e.g. in the production of explosive or powder strands. In the latter case, the pressure and temperature conditions within the extruder, particularly on the extruder head and on the retainer plate must be very accurately controlled, as a function of the components of the material to be processed, so as to ensure that the material does not detonate or deflagrate. Despite carefully respecting the operating parameters, it is not possible to entirely exclude such irregularities. As the material is under feed and shaping pressure and is completely enclosed within the casing, high energy levels are evolved during detonation or deflagration, which can lead to the destruction of machine components or the entire machine and also possibly the area around the machine.

It has therefore been proposed for special applications to fix the retainer plate to the casing by using hydraulic holding clamps, so as to permit the retainer plate to lift in the case of an excessive overpressure in the casing. However, this constructional measure only has the desired effect if the pressure build-up does not occur too rapidly. In addition, the holding clamps only have a limited travel, so that the exit cross-section on raising the retainer plate does not permit a sudden overpressure reduction However, the problem of an excessive pressure build-up in the casing also exists when extruding other materials. There can be numerous different causes for this, e.g. clogging of the retainer plate in the case of small shaping cross-sections, modification to the material composition and/or the plasticity of the material.

In the case of extruders for pressure-sensitive or temperature-sensitive products, it is known (DE-C-34 31 274), to provide a retainer plate with a linear row of nozzles and to construct the plate in two-part manner with a parting plane located in the nozzle row. One of the two parts of the retainer plate is fixed and the other Connected in articulated manner with the extruded casing and is consequently pivotable. The pivotable plate can be brought by a pneumatic cylinder from the closed into the open position In order to permit raising in a manner dependent on the pressure or temperature, in the extruder is provided a measuring device, which records the pressure or the temperature or some other measured quantity essential for the same and by a control system controls the pneumatic cylinder. This construction is much too slow for rapid pressure rises. It can also not be looked upon as an automatically operating overpressure preventer, because it is a measuring-technical control system. Therefore, it is particularly unsuitable for explosives. In addition, the pneumatic cylinder closes again after opening, without removing any hazard which may be present.

SUMMARY OF THE INVENTION

The aim underlying the present invention essentially resides in further developing the apparatus described hereinbefore, such that, in the case of the occurrence of an undesired overpressure in the casing an effective, sudden release is possible and also the retainer plate can be raised in an arbitrary manner when required, so that it can be easily replaced by another retainer plate for a different shaping function.

According to the invention, the retainer plate is fixed to the casing by a mechanical or a gas pressure spring, whose spring tension is adjustable and can be raised in random manner from the casing by a hydraulic pressure acting in opposition to the spring.

The inventive construction provides an effective overpressure preventer, because a mechanical or pneumatic spring can be compressed with a high speed and does not have to overcome any or any significant flow resistances. Such a spring can also be provided with a sufficiently large spring travel or displacement, so as to rapidly free a large exit cross-section. Finally, the spring tension can be very accurately adjusted, because it is not influenced by other factors to a significant extent, such as line resistances, etc. It is also possible to raise the retainer plate in random manner against the fixing pressure, it being unnecessary to reduce the latter. It is sufficient if the hydraulic circuit can be regulated to a pressure, which is sufficiently higher than the fixing pressure of the mechanical or gas pressure spring.

Preferably the retainer plate is fixed by two diametrically facing pressure cylinders arranged laterally on the casing and whose double-acting piston is connected by the piston rod to the retainer plate and is subject to the action of the spring on the piston rod side and to hydraulic action on the other side.

The overpressure preventer and the opening mechanism are consequently realized within a single component, namely a pressure cylinder, so that all the adjusting movements during fixing, as well as during the safety and arbitrary raising of the retainer plate are performed by one piston.

As a function of the necessary safety factor, the spring tension can be approximately 75% of the maximum hydraulic pressure, so that it is always ensured that an arbitrary raising under operating conditions is possible.

If the spring is constructed as a gas pressure spring, then advantageously the piston rod side space of the pressure cylinder is connected to a control cylinder, whose piston is supplied with the hydraulic control pressure on the side opposite to the gas pressure side.

Thus, the fixing pressure produced by the gas pressure spring can be very accurately regulated and modified in a simple manner. Such a modification is in particular also possible during operation.

Another embodiment of the invention is characterized in that the pressure cylinder on its end opposite to the retainer plate is pivotable about a transverse axis with respect to the casing and that the retainer plate is detachably connected to the piston rods.

The aforementioned construction makes it possible, after raising the retainer plate by the hydraulic pressure to pivot the plate upwards together with the pressure cylinders and e.g. replace same by another retainer plate for shaping other cross-sections. Thus, the retainer plate is no longer located on the casing, where it is conventionally fixed with screw anchors and the like, but is instead located on the piston rods, from which it can be released in the pivoted out position in problem-free manner and at an ergonomically favourable height.

Externally on the casing are appropriately provided in diametrically facing manner two bearing blocks, on each of which is pivotably mounted at least one of said pressure cylinders. These bearing blocks can easily be subsequently fitted to existing machines.

Although two pressure cylinders in diametral arrangement are sufficient, it is advantageous, particularly in the case of twin-shaft screw extruders, to arrange two pressure cylinders on opposite sides of the casing and to interconnect them at their ends opposite to the retainer plate by a crossbar, which is in turn pivotable on one of the bearing blocks. The crossbar, retainer plate and the interposed pressure cylinders form a type of frame, which readily takes up the pressures which occur and introduce same into the bearing blocks. The bearing blocks can e.g. be supported on the normally present outer rings on each casing member of the extruder, so that the forces are introduced substantially axially into the casing.

The invention is described in greater detail hereinafter relative to a non-limitative embodiment and the attached drawings.

DETAILED DESCRIPTION

Figure 2:
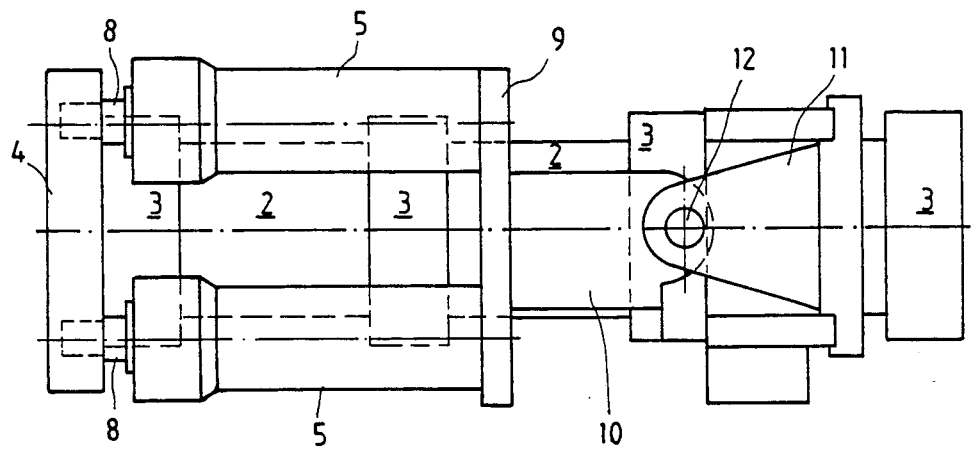
FIG. 2 is a side view with respect to the representation according to FIG. 1.
Figure 1:
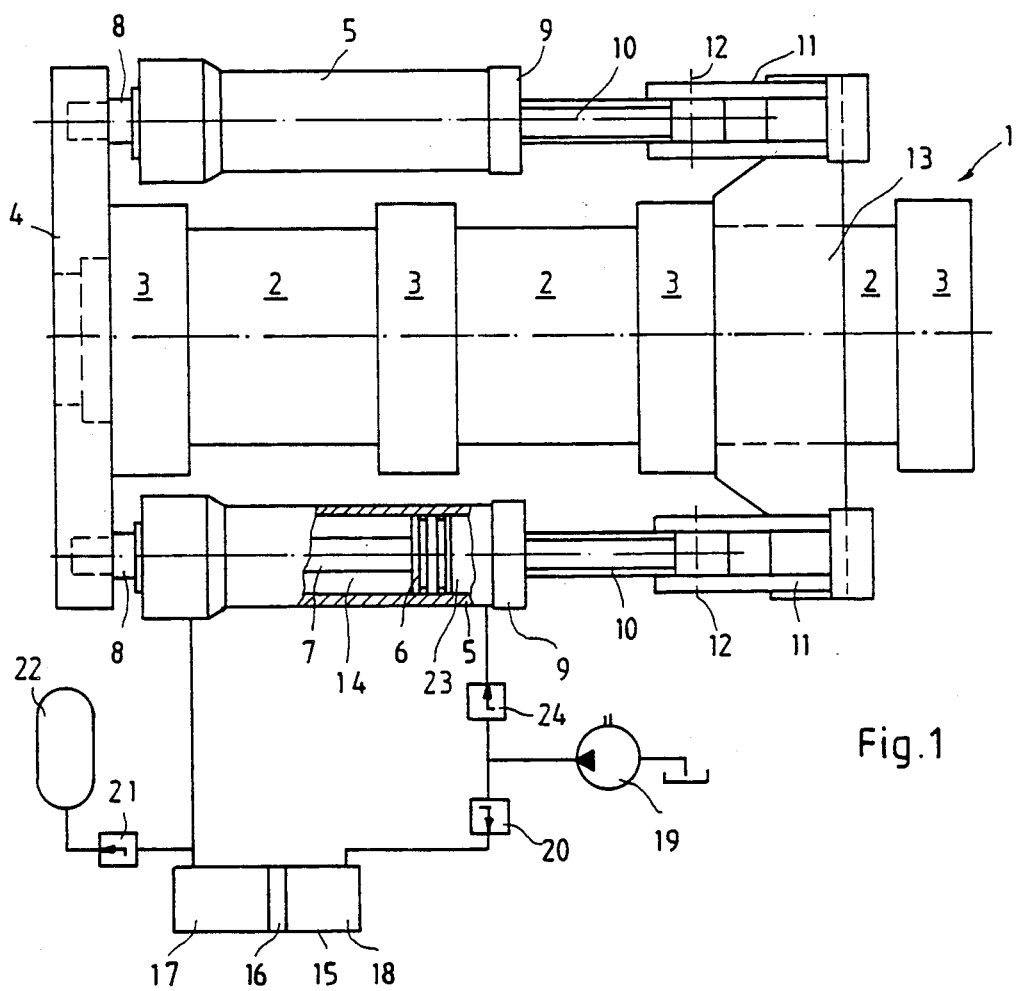
FIG. 1 is a plan view of an embodiment of the apparatus in the form of an extruder.

The apparatus for extruding plastic materials, particularly plastic propellants or explosives shown in longitudinal form in FIGS. 1 and 2 has a casing 1, which comprises a plurality of mainly cylindrical members 2 and interposed casing rings 3. One or two extruder screws, (not shown) are rotatably mounted in the casing 1. In order to plasticize and homogenize the material and convey the same towards a retainer plate 4. The retainer plate 4 can have one or more outlets, which are optionally also profiled, so as to be able to extrude the plastic material in the form of one or more strands.

The retainer plate 4 is fixed to the end of the apparatus casing 1 with the aid of pressure cylinders 5. In the represented embodiment, on either side of the casing 1 are superimposed in each case two pressure cylinders. Within the pressure cylinders 5 run pistons 6 (cf. the bottom of FIG. 1), whose piston rods 7 extend to the retainer plate 4. The latter is detachably fixed to the free ends 8 of piston rod 7.

The cylinders 5 are connected pairwise via a crossbar 9 at the end thereof remote from the retainer plate 4 and the crossbars are pivotably mounted by a rearwardly extending extension 10 on a journal 12 of a bearing block 11. Both the bearing blocks 11 are in turn interconnected by a transversely running yoke 13 and are detachably fixed to a casing member 2 with a casing ring 3 as an abutment.

The pressure cylinder 5 is subject to the action of a pressurized gas, e.g. nitrogen, in its front area 14 traversed by the piston rod 7. This forms a gas pressure spring, which elastically fixes the retainer plate 4 to the apparatus casing 1. The gas pressure can be regulated by a control cylinder 15 with a freely running piston 16. The area 17 of control cylinder 15 is connected for this purpose to area 14 of pressure cylinder 5, while the area 18 of control cylinder 15 facing piston 16 is connected to a hydraulic pump 19 with an interposed control valve 20. By regulating valve 20 and, therefore, the hydraulic pressure in area 18, it is possible to adjust the pressure in area 17 and, therefore, the tension of the gas pressure spring. It is regulated in such a way that it is located slightly above the operating pressure of the extruder. If the pressure in the extruder rises above this safety value, then the gas in area 14 of pressure cylinder 5 is compressed, accompanied by the extension of the piston rods, so that the retainer plate 4 rises from casing 1 and the internal pressure in casing 1 is relieved to the outside. The air circuit also contains a blowoff valve 21, which is optionally released into a lower pressure reservoir 22.

The area 23 of pressure cylinder 5 facing the area 14 on the other side of piston 6 is subject to the action of a hydraulic fluid and, to this end, is connected to the hydraulic pump 19 by a pressure regulating valve 24. By increasing the pressure in hydraulic area 23, the piston 6 can be moved towards the retainer plate 4 and the latter can be raised from the casing 1. This can take place, accompanied by a pressure reduction in the pneumatic circuit or also through a correspondingly high hydraulic pressure under the operating pressure in cylinder area 14. This makes it possible to raise the retainer plate 4 in an arbitrary manner, so that it can, for example, be replaced by another retainer plate. So that this can take place in a simple manner and also the interior of the casing can be inspected or even converted, the pressure cylinders 5 with the retainer plate 4 can be pivoted upwards about journal 12, so that the casing is completely free on the extruder head and the retainer plate 4 is also readily accessible.

We claim:

1. Apparatus for extruding plastic explosives or propellants, the apparatus comprising a casing, at least one pressing member movably mounted in said casing, a shaping retainer plate terminating an outlet side of the casing, means for fixing the retainer plate to the casing so as to be automatically raised relative to the casing upon an occurrence of a pressure within the apparatus exceeding a preset pressure, said means for fixing including a pneumatic spring means having a spring force substantially corresponding to said preset pressure, control means for applying a first control hydraulic pressure corresponding to the preset pressure on the pneumatic spring means, and hydraulic adjusting means for applying a second control pressure exceeding the preset pressure to the pneumatic spring means in a direction in opposition thereto to enable an arbitrary exceeding of the preset pressure to permit a selective raising of the retainer plate relative to the casing.

2. Apparatus according to claim 1, wherein said pneumatic spring means includes at least two diametrically opposed pressure-cylinder means arranged on respective lateral sides of the casing, each of said pressure-cylinder means including a double-acting piston and a piston rod connected to the retainer plate, each double acting piston having a first piston surface exposed to a pneumatic pressure corresponding to the preset pressure and a second piston surface exposed to the hydraulic pressure of said hydraulic adjusting means.

3. Apparatus according to one of claims 1 or 2, wherein said control means includes a control cylinder-piston means comprising a free-running piston disposed in a cylinder, said piston having a first piston surface exposed to the preset pressure and a second piston surface exposed to the hydraulic pressure of the control means.

4. Apparatus according to claim 2, wherein said means for fixing further includes means for pivotally mounting an end of said at least two pressure-cylinder means opposite to the retainer plate about a transverse axis with respect to the casing, and wherein the retainer plate is detachably connected to a free end of each piston rod of the respective at least two-pressure-cylinder means.

5. Apparatus according to claim 4, wherein said fixing means further includes two diametrically opposed bearing block means arranged at an outside of the casing, and wherein said at least two pressure-cylinder means are respectively mounted to said bearing block means.

6. Apparatus according to claim 5 wherein said means for fixing further includes a crossbar means pivotable on one of said bearing block means for interconnecting said at least two pressure-cylinder means together, said crossbar means being disposed at an end of the at least two pressure-cylinder means opposite the retainer plate whereby said crossbar means, said retainer plate and said at least two cylinder-piston means form a frame.

7. Apparatus according to claim 6, wherein the at least one pressing member includes a rotating extruder screw.

8. Apparatus according to claim 2, wherein said means for fixing includes means for pivotally mounting an end of said at least two pressure-cylinder means opposite to the retainer plate to the casing about a transverse axis with respect to the casing, and wherein the retainer plate is detachably connected to free ends of each piston rod of the respective at least two pressure-cylinder means.

9. Apparatus according to claim 2, wherein said fixing means includes two diametrically opposed block means arranged at an outside of the casing, and wherein said at least two pressure cylinder means are respectively mounted to said bearing block means.

10. Apparatus according to claim 2, wherein said means for fixing includes a crossbar means pivotably mounted on a bearing block means disposed on the outside of the casing for interconnecting said at least two pressure-cylinder means together, said crossbar means being disposed at an end of the at least two pressure-cylinder means opposite to the retainer plate whereby said crossbar means, said retainer plate and said at least two cylinder-piston means form a frame.

* * * * *